Figure 1:
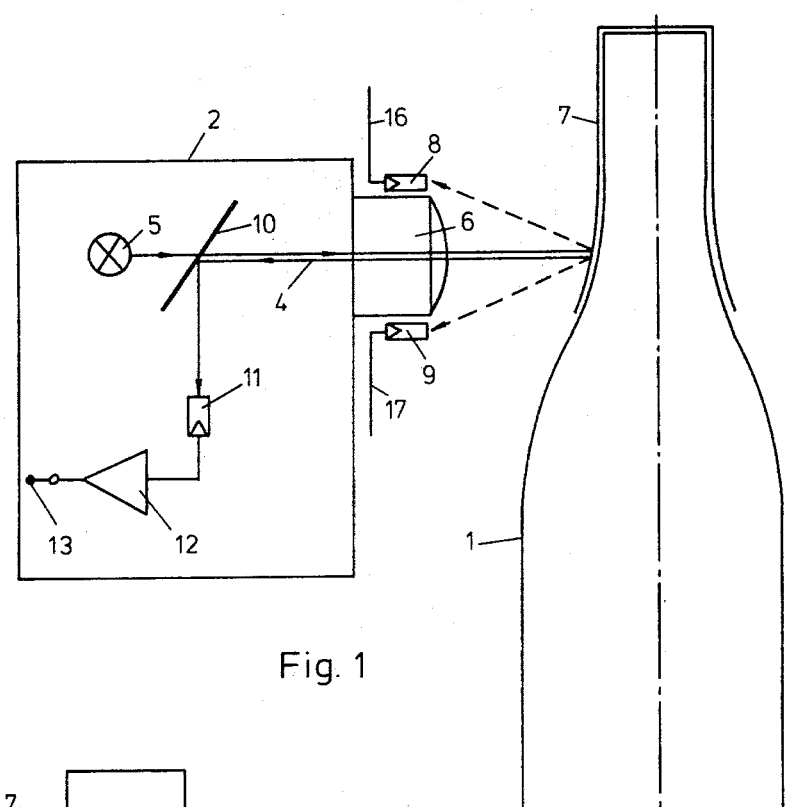

United States Patent [19]

Kurth

[11] 4,289,961
[45] Sep. 15, 1981

[54] APPARATUS FOR SCANNING THE MARKINGS ON BOTTLE NECKS

[75] Inventor: Wilfried Kurth, Düsseldorf, Fed. Rep. of Germany

[73] Assignee: Jagenberg-Werke, Postfach, Fed. Rep. of Germany

[21] Appl. No.: 966,992

[22] Filed: Jan. 11, 1979

[30] Foreign Application Priority Data

Dec. 6, 1977 [DE] Fed. Rep. of Germany ....... 2754319

[51] Int. Cl.³ ............................................. G01V 9/04
[52] U.S. Cl. ................................. 250/223 B; 209/524
[58] Field of Search ...................... 209/522, 524, 528; 250/223 B, 566, 567, 568, 571, 572, 562, 563; 356/445, 446, 448

[56] References Cited

U.S. PATENT DOCUMENTS 3,283,162 11/1966 Quittner ............................ 250/572
3,430,766  3/1969 Stone ................................. 209/528
3,533,657 10/1970 Da Silva ........................... 250/568

Primary Examiner—David C. Nelms
Attorney, Agent, or Firm—Sprung, Felfe, Horn, Lynch & Kramer

[57] ABSTRACT

In an apparatus for scanning the markings on foils on the necks of the bottles in a bottle labeling machine having a photoelectric scanner including a light source and a lens for illuminating the foil on the bottle neck, a one-way mirror in the path of the light, a photosensitive receiver and a first amplifier connected thereto, the improvement wherein the photosensitive receiver comprises a pair of photoelectric elements respectively provided on the upper and lower edges of the lens, and an integrating amplifier operatively connected to each output of the pair of photoelectric receivers. The photoelectric elements are preferably photocells located either within or outside the lens in a line parallel to the bottle axis and diametrically to the lens. A selector switch may be provided to switch from the integrated output-scanning to auto-collimation.

5 Claims, 4 Drawing Figures

APPARATUS FOR SCANNING THE MARKINGS ON BOTTLE NECKS

The invention relates to an apparatus for scanning the markings on foils on the necks of the bottles in a bottle labeling machine, including a photoelectric scanner with a light source and a lens for illuminating the foil on the bottle neck, a one-way mirror located in the path of light, a photosensitive element and an amplifier connected thereto.

The markings printed on the foils on the bottlenecks are used for example to determine the position of the bottles during the labeling operation in the bottle labeling machine and the difference in reflection of the marking and the surrounding foil is employed therefor.

In the prior art apparatus described above, the markings are detected by photoelectrical scanners operating on the basis of the auto-collimation principle. The light transmitted from the light source passes through the one-way mirror and the lens onto the foil with the markings on the bottleneck. The light reflected from the foil returns through the same lens to the one-way mirror and from there is diverted to the photosensitive element. The photosensitive element generates an output voltage corresponding to the amount of reflected light and said voltage is then increased in the connected amplifier to the output voltage required for subsequent processes.

When a foil is applied to the neck of a bottle, the foil might crease or fold. The prior art apparatus does not safely distinguish between such undesirable creases or folds and the markings on the foil material, depending on the characteristics of the foil, such as the color and roughness of the foil material. The creases may cause the light incident on the foil to deflect and thus simulate a non-existent marking.

It is an object of the present invention to provide an apparatus of the type described above which ensures the correct detection of the markings on the foils on the bottlenecks even where there are creases and folds in the material.

The object according to the invention is realized by providing one photosensitive element each on the upper and the lower edge of the lens and connecting the outputs of the photosensitive elements to an integrating amplifier.

In the apparatus according to the invention, the light incident on the foil is diffusely reflected by means of the light source, the one-way mirror and the lens onto both photosensitive elements at the edge of the lens.

The output voltage of the two photosensitive elements is added in the integrating amplifier. When folds and creases are encountered, the one photosensitive element is subjected more to diffused light and the second photosensitive element is subjected to it less. The total output voltage of the photosensitive elements is however substantially constant such that the folds do no longer interfere with the correct scanning process. But, when a marking appears, both photosensitive elements darken which results in a substantial change in the output voltage of the integrating amplifier which makes it possible to detect the marking.

Since the photoelectric scanner in the apparatus according to the invention picks up reflected light, any possible misalignment of the bottle with respect to the optical axis of the scanner, which is possible for example due to tumbling motions of the bottle, does not substantially influence the results of the scanning. Rather, markings are detected without any difficulties, even if the axis of the bottle is not perfectly in line with the optical axis of the photoelectric scanner.

Advantageously, the photosensitive elements are photoelements which simplifies particularly the structure of the apparatus according to the invention.

The photosensitive elements are provided either outside or inside of the lens, as needed. They are arranged advantageously parallel to the bottle axis and diametrically to the lens, thereby obtaining an optimum signal-noise ratio in the output of the scanner.

When different bottles and types of foils are used in a bottle labeling machine, such types of foil may be used where the photoelectric scanner working with diffused reflection does not provide an output voltage adequate for further processing. In this case, according to a further embodiment of the invention, it is possible to change over to the known auto collimation process which provides, especially in this particular case, sufficient output voltages for the detection of the markings.

This switch is effected such that a selector switch is provided either between the first amplifier in the scanner and the integrating amplifier and the output of the scanner, or that the first amplifier is also used as an integrating amplifier and there is a selector switch in the input of the amplifier for selectively switching over to the first photosensitive element and to the two photosensitive elements provided on the edge of the lens.

Figure 2:
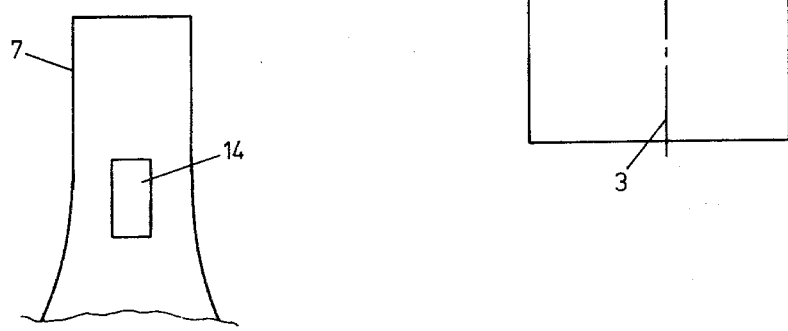
Figure 3:
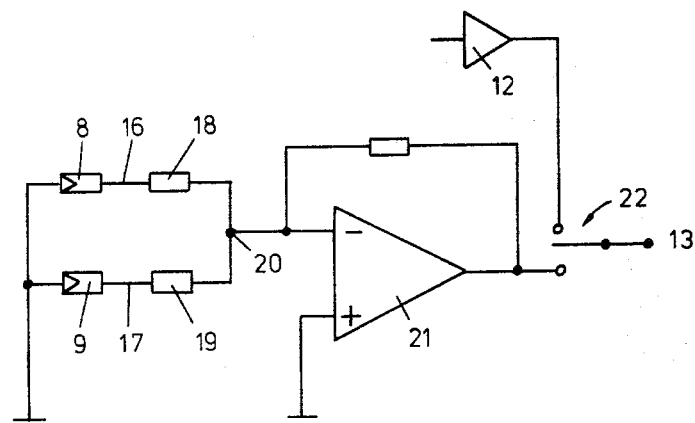
Figure 4:
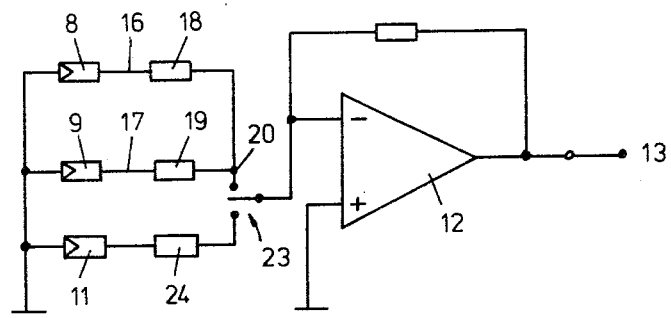

The embodiments of the invention are further described hereinafter with reference to the drawings, wherein FIG. 1 is a schematic drawing of the apparatus according to the invention with a bottle in the scanning position, FIG. 2 is a plan view of a marking on a foil on the bottleneck, as seen in the direction of the optical axis of the scanner, FIG. 3 is a basic circuit diagram of a circuit for the amplification of the output voltages of the photosensitive elements in the apparatus according to FIG. 1, and FIG. 4 is a basic circuit diagram of a further embodiment of the circuit according to FIG. 3.

FIG. 1 is a schematic drawing of the apparatus according to the invention for scanning the markings provided on the foils on the bottleneck. A bottle 1 is located in front of a photoelectric scanner 2, such that the longitudinal axis 3 of the bottle 1 and the optical axis 4 of the scanner 2 intersect. A light source 5, preferably a light bulb, in the scanner 2 throws light through a lens 6 of the scanner 2 onto a foil 7 on the bottle.

The photosensitive elements 8 and 9 are provided respectively on the lower and upper edge of the lens 6. The photosensitive elements 8 and 9 are preferably photocells and absorb diffusely reflected light from the foil 7.

The scanner as shown in FIG. 1 is furthermore provided with a one-way mirror 10 which permits the light to pass through the light source 5 to the lens 6; however, the mirror 10 partly deflects the light returning through the lens 6 to another photosensitive element 11, which is advantageously also a photocell. The output of the photosensitive element 11 is connected to an amplifier 12 and its output in turn is connected to the output 13 of the scanner.

FIG. 2 shows the foil attached on the bottle neck in the direction of the optical axis of the scanner 2. A marking 14 is shown on the lower edge of the foil. By means of the apparatus herein described, the marking 14 is detected and during the labeling process, it ensures that other labels are perfectly aligned with the marking 14.

FIG. 3 shows the circuit of the photosensitive elements 8 and 9 and an amplifier. The outputs of the photosensitive elements 8 and 9 are connected through lines 16 and 17 to resistors 18 and 19. The outputs of the resistors 18 and 19 are connected in an integrating point 20 and then conducted to an amplifier 21. The output of the amplifier 21 can directly lead to the output 13 of the scanner 2 or there can be a switch 22 between the output of the scanner 2 and the output of the amplifier 21, which enables it to selectively switch the output of the amplifier 21 or the output of the amplifier 12 to the output 13 of the scanner. This permits the scanner to be operated selectively with diffusely reflective light or by auto-collimation.

FIG. 4 shows the circuit diagram for another possibility of switching between operation with diffusely reflected light or with auto-collimation. In this case, the first amplifier 12 is also used as an integrating amplifier. In the input of the amplifier 12, there is a switch 23 which enables it to switch selectively to the input of the amplifier 12 either the integrating point 20 or the output of a resistor 24 connected after one of the photosensitive elements 11. The output of the amplifier 12 is directly connected with the output of the scanner 2. It is understood that the selector switches 22 and 23 can be either mechanical or electronic.

The operation of the apparatus for scanning the markings on the foils on bottlenecks is as follows. A ray of light is directed to the foil on the bottleneck by means of the light source 5 and through the one-way mirror 10 and the lens 6. The light is diffusely reflected by the foil to the photosensitive elements 8 and 9 and their output voltages are added by means of the amplifier 21 and 12 respectively. The output voltage of the amplifier 21 and 12 respectively shows a characteristic rise and a clearly recognizable peak only when a marking 14 is in the area of the light incident from the light source 5. This characteristic increase in voltage and the peak output voltage of the amplifier respectively is clearly noticeable even when the axis 3 of bottle 1 is laterally out of alignment with respect to the optical axis 4 of the scanner 2, which is due to the tumbling motions of the bottle.

In the event that there is insufficient voltage at the output of the integrating amplifier 21 and 12 respectively to clearly detect the marking on certain types of foil, it is possible to switch the scanner 2 to auto-collimation operation as described in detail with reference to FIGS. 3 and 4.

It will be appreciated that the instant specification and examples are set forth by way of illustration and not limitation, and that various modifications and changes may be made without departing from the spirit and scope of the present invention.

What is claimed is:

1. In an apparatus for scanning the markings on foils on the necks of the bottles in a bottle labeling machine having a photoelectric scanner including a light source and a lens for illuminating the foil on the bottle neck, a beam splitter in the path of the light, a photosensitive receiver and a first amplifier having the input thereof receptive of the receiver output, the improvement wherein the photosensitive receiver comprises a pair of photoelectric elements respectively provided outside of the lens and wherein the first amplifier comprises an integrating amplifier operatively connected to each output of the pair of photoelectric elements.

2. An apparatus according to claim 1 or claim 5, wherein the photoelectric elements are photocells.

3. An apparatus according to claim 1, wherein the photoelectric elements are located at the upper and lower edges of the lens in a line parallel with the axis of the bottle and diametrically to the lens.

4. An apparatus according to claim 1 or claim 3, wherein the photosensitive receiver comprises a third photoelectric element receptive of reflected light from the beam splitter and a second amplifier connected to the output thereof and further comprising a switch which selects between the output of the first amplifier in the scanner and the output of the second amplifier.

5. An apparatus according to claim 1 or claim 3, wherein the photosensitive receiver comprises a third photosensitive element receptive of reflected light from the beam splitter and further comprising a selector switch connected to the input of the first amplifier for selective switching between the output of the third photosensitive element and the outputs said pair of photosensitive elements.

* * * * *

UNITED STATES PATENT AND TRADEMARK OFFICE
CERTIFICATE OF CORRECTION

PATENT NO. : 4,289,961
DATED : Sep. 15, 1981
INVENTOR(S) : Wilfried Kurth

It is certified that error appears in the above–identified patent and that said Letters Patent are hereby corrected as shown below:

Title Page Assignment   Delete "Postfach" and insert --Dusseldorf--.

Col. 4, line 25   Delete "5" and insert --3--.

Signed and Sealed this

Twenty-fifth Day of May 1982

[SEAL]

Attest:

GERALD J. MOSSINGHOFF

Attesting Officer    Commissioner of Patents and Trademarks